US012639392B2

(12) United States Patent
Zhang

(10) Patent No.: US 12,639,392 B2
(45) Date of Patent: May 26, 2026

(54) WEBPAGE RENDERING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Yuang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 329 days.

(21) Appl. No.: 18/349,950

(22) Filed: Jul. 10, 2023

(65) Prior Publication Data

US 2023/0359688 A1 Nov. 9, 2023

Related U.S. Application Data

(63) Continuation of application No. PCT/CN2022/129536, filed on Nov. 3, 2022.

(30) Foreign Application Priority Data

Jan. 25, 2022 (CN) .......................... 202210090105.5

(51) Int. Cl.
*G06F 16/958* (2019.01)
*G06F 9/451* (2018.01)
*G06F 16/957* (2019.01)

(52) U.S. Cl.
CPC ............ *G06F 16/958* (2019.01); *G06F 9/451* (2018.02); *G06F 16/957* (2019.01)

(58) Field of Classification Search
CPC .................................................... G06F 16/958
See application file for complete search history.

(56) References Cited

U.S. PATENT DOCUMENTS

2003/0025728 A1 2/2003 Ebbo et al.
2013/0145361 A1* 6/2013 Kaegi ..................... G06F 17/21
(Continued)

FOREIGN PATENT DOCUMENTS

CN 105677307 A 6/2016
CN 107291458 A 10/2017
(Continued)

OTHER PUBLICATIONS

The European Patent Office (EPO) the Extended European Search Report for Application No. 22923375.4 Jan. 17, 2025 3 Pages.
(Continued)

*Primary Examiner* — James J Debrow
(74) *Attorney, Agent, or Firm* — Anova Law Group, PLLC

(57) ABSTRACT

Disclosed are a webpage rendering method and apparatus, a device, and a storage medium, and belong to the field of webpage development technologies. The method includes operating a front-end plugin in a front-end application, the front-end plugin being uncoupled from a server-side plugin, and the server-side plugin being configured to provide a webpage rendering function at a server side; requesting the server-side plugin to render a webpage source code of the webpage through the front-end plugin in response to an open operation for a webpage; and receiving a rendering result of the webpage sent by the server-side plugin through the front-end plugin.

14 Claims, 9 Drawing Sheets

(56) References Cited

U.S. PATENT DOCUMENTS

| | | | | |
|---|---|---|---|---|
| 2014/0281918 A1* | 9/2014 | Wei et al. | .......... | G06F 17/2247 |
| 2018/0083959 A1* | 3/2018 | Barbosa et al. | .... | H04L 63/0853 |
| 2018/0349283 A1* | 12/2018 | Bhatia et al. | ....... | G06F 12/0868 |

FOREIGN PATENT DOCUMENTS

| | | | |
|---|---|---|---|
| CN | 107729516 | A | 2/2018 |
| CN | 108846087 | A | 11/2018 |
| CN | 109117174 | A | 1/2019 |
| CN | 109274724 | A | 1/2019 |
| CN | 111104587 | A | 5/2020 |
| CN | 111880789 | A | 11/2020 |
| CN | 112699326 | A | 4/2021 |
| CN | 112749358 | A | 5/2021 |
| CN | 113010827 | A | 6/2021 |
| CN | 113761428 | A | 12/2021 |
| WO | 2018217771 | A1 | 11/2018 |

OTHER PUBLICATIONS

The World Intellectual Property Organization (WIPO) International Search Report for PCT/CN2022/129536 Jan. 17, 2023 7 Pages (including translation).
China National Intellectual Property Administration (CNIPA), Office Action 1 for Application No. 202210090105.5, Dec. 15, 2025, 9 Pages (including translation).

* cited by examiner

160

160

Wired or wireless network

120

140

User accounts

Permissions of the user accounts

Page data

...

Permission management unit 120a

Page data management unit 120b

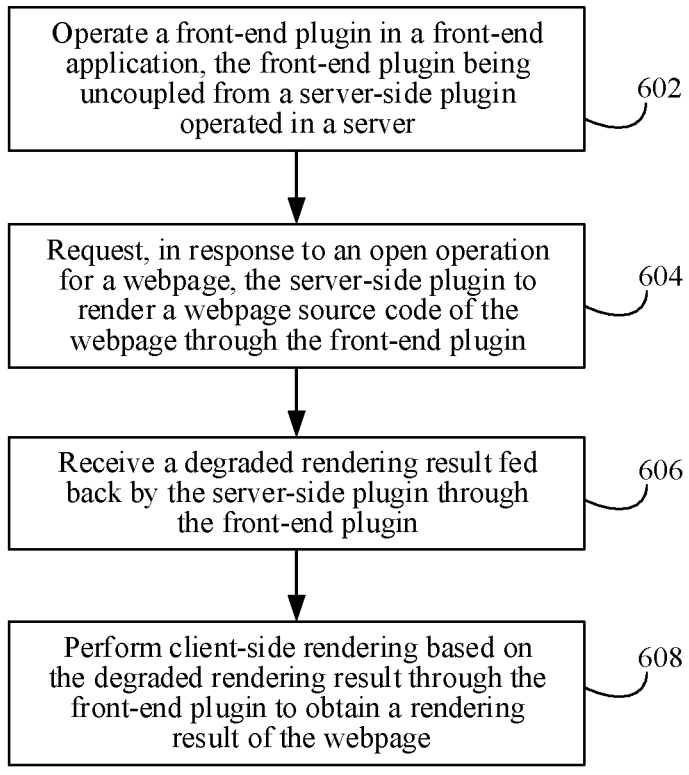

Operate a front-end plugin in a front-end application, the front-end plugin being uncoupled from a server-side plugin operated in a server — 602

Request, in response to an open operation for a webpage, the server-side plugin to render a webpage source code of the webpage through the front-end plugin — 604

Receive a degraded rendering result fed back by the server-side plugin through the front-end plugin — 606

Perform client-side rendering based on the degraded rendering result through the front-end plugin to obtain a rendering result of the webpage — 608

FIG. 6

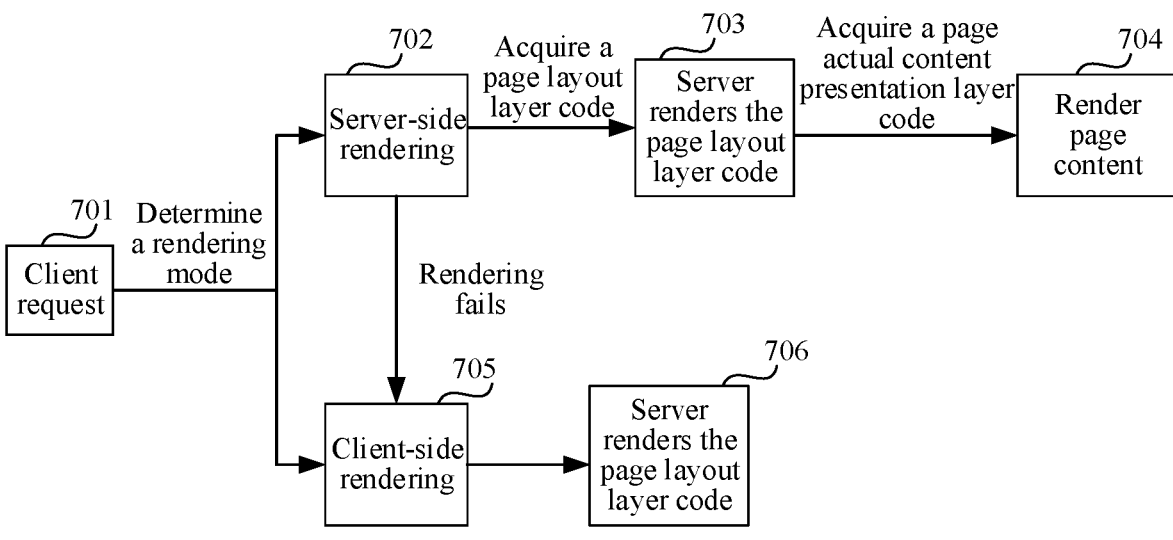

701 Client request

Determine a rendering mode

702 Server-side rendering

Acquire a page layout layer code

703 Server renders the page layout layer code

Acquire a page actual content presentation layer code

704 Render page content

Rendering fails

705 Client-side rendering

706 Server renders the page layout layer code

FIG. 7

Operate a server-side plugin in a server, the server-side plugin being uncoupled from a front-end plugin operated in a front-end application — 902

Render a webpage source code of a webpage requested by the front-end plugin through the server-side plugin to obtain a rendering result of the webpage — 904

Feed back the rendering result of the webpage to the front-end plugin — 906

WEBPAGE RENDERING METHOD AND APPARATUS, DEVICE, AND STORAGE MEDIUM

RELATED APPLICATIONS

This application is a continuation of PCT Application No. PCT/CN2022/129536 filed on Nov. 3, 2022, which claims priority to Chinese Patent Application No. 202210090105.5, entitled "WEBPAGE RENDERING METHOD AND APPARATUS, DEVICE, AND STORAGE MEDIUM" filed with the China National Intellectual Property Administration on Jan. 25, 2022. The two applications are both incorporated herein by reference in their entirety.

FIELD OF THE TECHNOLOGY

This application relates to the field of webpage development technologies, and in particular, to a webpage rendering method and apparatus, a device, and a storage medium.

BACKGROUND OF THE DISCLOSURE

Commonly used webpage rendering methods mainly include server-side render (SSR) and client-side render (CSR). The principle of SSR is to assemble a HyperText Markup Language (HTML) page and its corresponding dynamic data at a server side, and then directly present a complete page (rendering result) at a client side. The principle of CSR is to assemble an HTML page and dynamic data at a client side.

In the related technologies, a front-end framework-based server-side rendering framework compatible with SSR and CSR achieves the effects of server-side source saving, fast server side rendered home screen loading, search engine optimization (SEO), and the like.

However, in the foregoing solution, the server-side rendering framework can only support a single front-end framework, that is, the server side rendering framework corresponds to the front-end framework in a one-to-one manner, and the server side rendering framework is only applicable to a single front-end framework scenario.

SUMMARY

This application provides a webpage rendering method and apparatus, a device, and a storage medium. The technical solutions will be described below.

One aspect of this application provides a webpage rendering method, which is performed by a terminal. The method includes operating a front-end plugin in a front-end application, the front-end plugin being uncoupled from a server-side plugin, and the server-side plugin being configured to provide a webpage rendering function at a server side; requesting the server-side plugin to render a webpage source code of the webpage through the front-end plugin in response to an open operation for a webpage; and receiving a rendering result of the webpage sent by the server-side plugin through the front-end plugin.

Another aspect of this application provides a webpage rendering method, performed by a server. The method includes operating a server-side plugin, the server-side plugin being uncoupled from a front-end plugin operated in a front-end application, and the server-side plugin being configured to provide a webpage rendering function at a server side; rendering a webpage source code of a webpage requested by the front-end plugin through the server-side plugin to obtain a rendering result of the webpage; and sending the rendering result of the webpage to the front-end plugin.

According to another aspect of this application, a non-transitory computer-readable storage medium is provided, which stores at least one piece of computer program that, when loaded and executed by a processor, implements the webpage rendering method according to the foregoing aspect.

In embodiments consistent with the present application, a front-end plugin is operated in a front-end application; a server-side plugin is requested, in response to an open operation for a webpage, to render a webpage source code of the webpage through the front-end plugin; and a rendering result of the webpage sent back by the server-side plugin is received through the front-end plugin. According to the technical solutions provided in the embodiments of this application, server-side rendering of a webpage is realized by inserting plugins into a front-end framework and a back-end framework, so that the front-end framework inserted with the front-end plugins may be applied to a variety of front-end framework scenarios through different front-end plugins.

That is, the problem of one-to-one correspondence between a front-end framework and a server-side framework in the related technologies is solved, the front-end plugin and the server-side plugin of this application are uncoupled from each other. In a case that a front-end framework 1 is replaced, a terminal will use a front-end framework 2 and a front-end plugin 2 corresponding to the front-end framework 2 after replacement, and a server does not need to change an original server-side plugin. That is, one server-side plugin corresponds to a plurality of front-end plugins, and one server-side framework corresponds to a plurality of front-end frameworks at the same time.

BRIEF DESCRIPTION OF THE DRAWINGS

FIG. 6 is a flowchart of a webpage rendering method according to an embodiment of this application.

FIG. 7 is a schematic diagram of a rendering mode degradation process framework according to an embodiment of this application.

DESCRIPTION OF EMBODIMENTS

Figure 1:
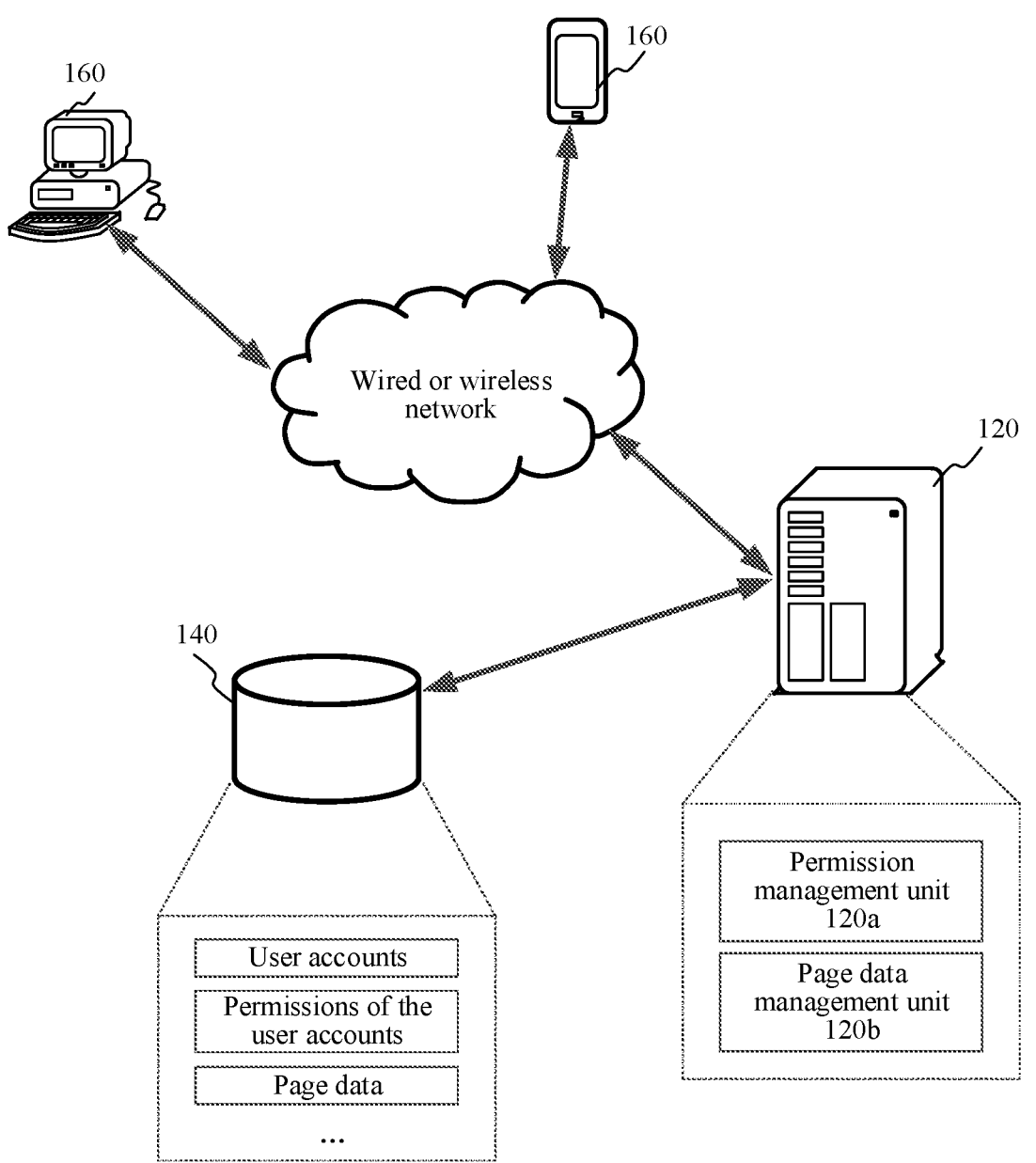
FIG. 1 is a schematic diagram of a system composition of a webpage rendering system according to an embodiment of this application.

Referring to FIG. 1, FIG. 1 is a schematic diagram of a system composition of a webpage rendering system involved in the embodiments of this application. As shown in FIG. 1, the system includes a server 120, a database 140, and several clients 160.

The server 120 is a single server, a server cluster composed of several servers, a virtualization platform or a cloud computing service center.

The server 120 may be composed of one or more function units. In some embodiments, as shown in FIG. 1, the server 120 may further include: a permission management unit 120a, a page data management unit 120b, and the like.

Permission management unit 120a is configured to generate, update, and maintain a permission corresponding to each user account, and provide each client 160 with information such as a permission processed by the client 160 in a current login state.

The page data management unit 120b is configured to manage page data in pages developed by developers, receive a request from the client 160, and transmit page data requested by the client 160 to the client 160, so that the client 160 presents the page data.

The foregoing database 140 may be a Redis database or a database of another type. database 140 is configured to store various types of data such as user accounts, permissions processed by the user accounts, and page data of pages.

Client 160 may be a terminal device with the network connection function and page presentation function. For example, client 160 may be a mobile phone, a tablet computer, an ebook reader, smart glasses, a smart watch or an on-board terminal.

For example, client 160 may be installed with a browser or other web applications (such as a web client).

Client 160 is connected to server 120 through a communication network. In some embodiments, the communication network is a wired network or a wireless network.

In some embodiments, the system may further include a management device (not shown in FIG. 1) that is connected to the server 120 through a communication network. In some embodiments, the communication network is a wired network or a wireless network.

In some embodiments, the foregoing wireless network or wired network uses a standard communication technology and/or protocol. The network is usually the Internet, and may be any other network, which includes, but is not limited to, a local area network (LAN), a metropolitan area network (MAN), a wide area network (WAN), a mobile, wired or wireless network, or any combination of private networks or virtual private networks. In some embodiments, data exchanged by using a network may be represented by a technology and/or format such as the HyperText Markup Language (HTML) and Extensible Markup Language (XML). In addition, all or some links may be encrypted by conventional encryption technology such as Secure Socket Layer (SSL), Transport Layer Security (TLS), Virtual Private Network (VPN), and Internet Protocol Security (IPsec). In some other embodiments, the foregoing data communication technologies may also be replaced or supplemented with a custom and/or private data communication technology.

Figure 2:
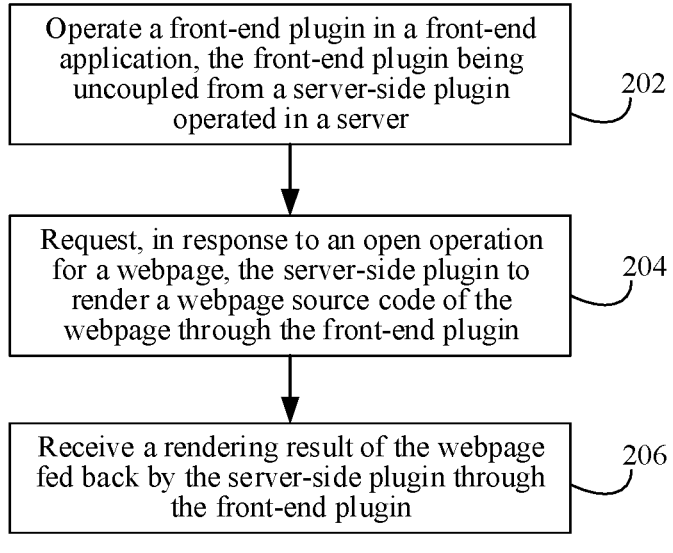
FIG. 2 is a flowchart of a webpage rendering method according to an embodiment of this application.

FIG. 2 is a flowchart of a webpage rendering method according to an embodiment of this application. The method may be applied to a computer device to realize rendering of a webpage. The foregoing computer device may be client 160 in the system shown in FIG. 1. The method includes the following steps.

Step 202: Operate a front-end plugin in a front-end application, the front-end plugin being uncoupled from a server-side plugin operated in a server.

A front end refers to a foreground part of a website and is operated on a browser at a personal computer (PC) side, a mobile side or the like to display a webpage for a user to browse.

The front-end plugin refers to a plugin with a customized instruction function and is configured to provide a webpage rendering function at a client side. The server-side plugin refers to a plugin with a customized instruction function and is configured to provide a webpage rendering function at a server side. The front-end plugin and the server-side plugin cooperatively complete a whole rendering process of a webpage.

Webpage rendering refers to a process of converting source code corresponding to page objects in a webpage into a visual image.

The page objects refer to objects with various granularities in the webpage that may be controlled by the front-end plugin alone. For example, in a page, the page itself may be taken as a page object, each page component included in the page may also be taken as a separate page object, and a page element included in each page component may also be taken as a separate page object.

In some embodiments of this application, the page object may be a current page itself, or the page object may be a certain page component in the current page, or the foregoing page object may be an element in the certain page component in the current page.

The foregoing page component is a container for encapsulating one or more elements. For example, the page component may be an input box or a drop-down box in a page. In some embodiments, in a case that the foregoing page is a webpage, the page component may be a webpage component or a web component.

"Uncoupled" refers to that a type of the front-end plugin that is unrelated to a type of the server-side plugin. The front-end plugin and the server-side plugin may be arbitrarily combined. In some embodiments, the front-end plugin is any one of a World-Wide-Web development framework React plugin, a progressive front-end framework Vue2.0 plugin, and a progressive front-end framework Vue3.0 plugin. The server-side plugin is any one of a NestJS development framework plugin and a Midway development framework plugin. The front-end plugin is uncoupled from the server-side plugin, so that the webpage rendering method of this application may be applied to all development scenarios.

Step 204: Request, in response to an open operation for a webpage, the server-side plugin to render a webpage source code of the webpage through the front-end plugin.

The webpage source code refers to a human-readable text written in a specific programming language, and may represent elements (such as pictures, videos, music, and characters) on a webpage as a standard language.

In some embodiments, the client requests, in response to the open operation for the webpage, a page resource from the server, that is, requests the server-side plugin to render the webpage source code of the webpage through the front-end plugin.

Step 206: Receive a rendering result of the webpage sent back by the server-side plugin through the front-end plugin.

After the client transmits a Uniform Resource Locator for requesting a page resource to the server, the server-side plugin in the server acquires a webpage source code of a webpage and renders the webpage source code of the webpage, the server sends back a rendering result of the webpage to the client after the rendering is completed, and the client receives the rendering result of the webpage sent back by the server-side plugin through the front-end plugin.

Based on the above, according to the method provided in this embodiment, the front-end plugin is operated in the front-end application, the server-side plugin is requested, in response to an open operation for a webpage, to render a webpage source code of the webpage through the front-end plugin, and a rendering result of the webpage sent back by the server-side plugin is received through the front-end plugin. According to some embodiments of this application, server-side rendering of a webpage is realized by inserting plugins into a front-end framework and a back-end framework, the front-end plugin completes the rendering of the webpage by receiving a rendering result of the webpage sent back by the server-side plugin, and the front-end framework inserted with the front-end plugins may be applied to a variety of front-end framework scenarios through different front-end plugins.

Figure 3:
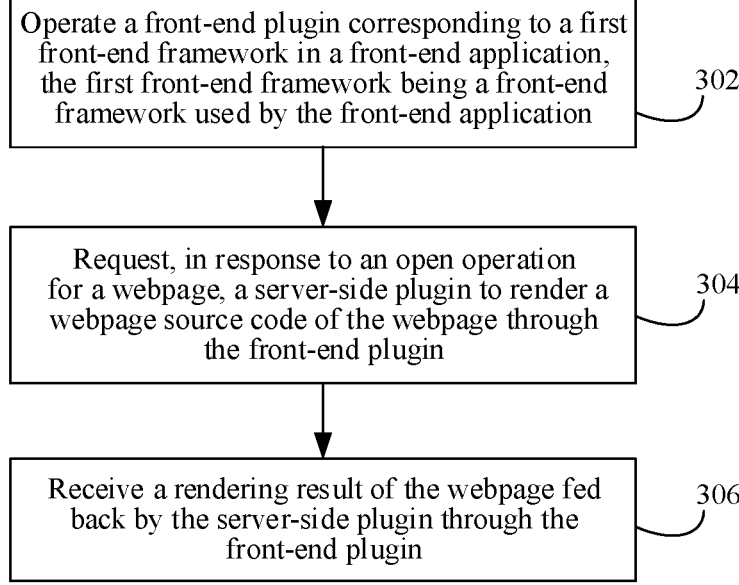
FIG. 3 is a flowchart of a webpage rendering method according to an embodiment of this application.

FIG. 3 is a flowchart of a webpage rendering method according to an embodiment of this application. The method may be applied to a computer device to realize rendering of a webpage. The foregoing computer device may be client 160 in the system shown in FIG. 1. The method includes the following steps.

Step 302: Operate a front-end plugin corresponding to a first front-end framework in a front-end application, the first front-end framework being a front-end framework used by the front-end application.

A front end refers to a foreground part of a website, and is operated on a browser at a personal computer (PC) side, a mobile side or the like to display a webpage for a user to browse.

The front-end plugin refers to a plugin with a customized instruction function and is configured to provide a webpage rendering function at a client side. The server-side plugin refers to a plugin with a customized instruction function and is configured to provide a webpage rendering function at a server side. The front-end plugin and the server-side plugin cooperatively complete a whole rendering process of a webpage.

Webpage rendering refers to a process of converting source code corresponding to page objects in a webpage into a visual image.

The front-end framework refers to a front-end framework with a customized instruction function, such as the World-Wide-Web development framework React, the progressive front-end framework Vue2.0, and the progressive front-end framework Vue3.0. These frameworks encapsulate some basic functions such as HTML, document manipulation and various controls (such as a button and a form).

In some embodiments, the front-end plugin corresponding to the front-end framework used by the front-end application is operated in the front-end application. Front-end plugins corresponding to different front-end frameworks have the same operation logic and different adaptive designs. That is, by replacing different plugins, the webpage rendering process may be applied to a variety of front-end framework scenarios.

In some embodiments, different front-end frameworks include at least two of the World-Wide-Web development framework React, the progressive front-end framework Vue2.0, and the progressive front-end framework Vue3.0.

Figure 4:
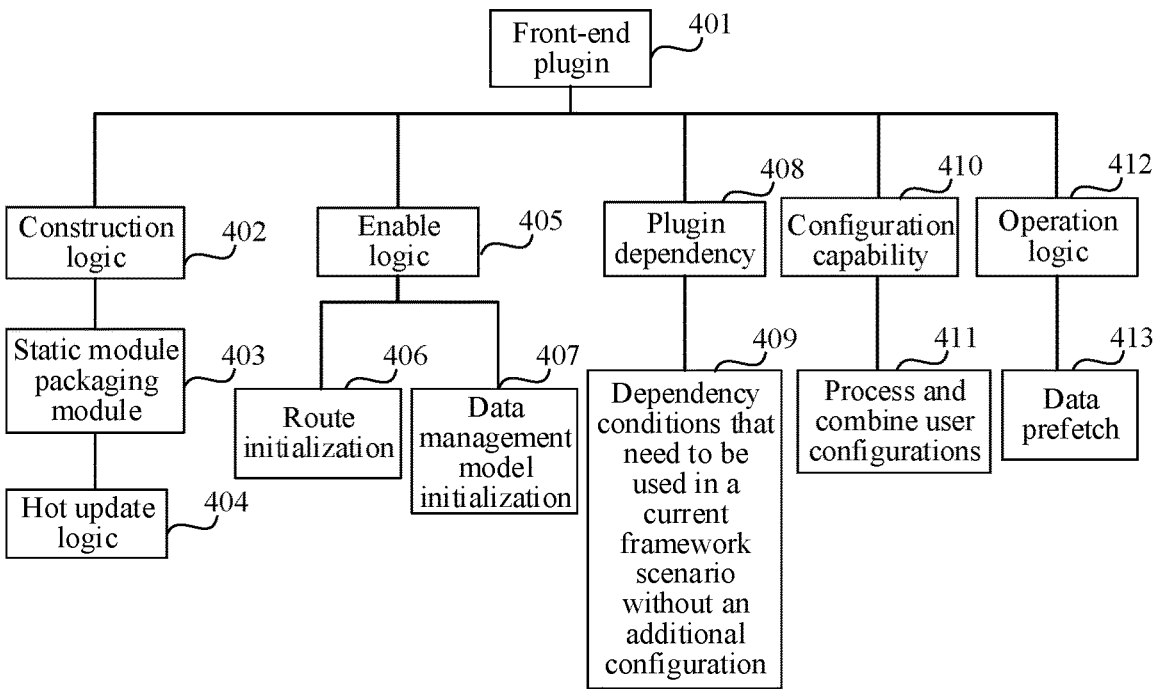
FIG. 4 is a schematic diagram of an adaptive design of a front-end plugin according to an embodiment of this application.

In some embodiments, FIG. 4 is a schematic diagram of an adaptive design of a front-end plugin, an adaptive design of a front-end plugin 401 includes, but is not limited to, its own construction logic 402, enable logic 405, plugin dependency logic 408, configuration capability 410, and an operation logic 412, which is not defined herein.

For example, the construction logic 402 of the front-end plugin 401 refers to that a source code or acquired data is packaged and classified based on a static module packaging module Webpack 403, partial rendering of a webpage may be realized based on a hot update logic 404 of the static module packaging module Webpack 403, and a current page state, such as a selected state of a check box and an input of an input box, is retained.

For example, the enable logic 405 of the front-end plugin 401 refers to that route initialization 406 and data management model initialization 407 are performed on the front-end plugin 401 when the front-end plugin 401 is started and operated, the route initialization 406 refers to initialization of a correspondence between a page object in a webpage and a webpage source code, and the data management model initialization 407 is also referred to as store initialization and refers to initialization of a data model in the front-end plugin 401 when the front-end plugin 401 is started. The data management model is configured to manage all data in a front-end component, and manipulate and modify all data in the front-end component.

For example, the plugin dependency 408 of the front-end plugin 401 refers to dependency conditions that the current front-end plugin 401 needs to use in a current framework scenario without additional configuration 409, that is, the front-end plugin 401 includes the dependency conditions required for operation of the current front-end plugin 401 in the current framework scenario, and no additional configuration is required.

For example, the configuration capacity 410 of the front-end plugin 401 refers to that the front-end plugin 401 can process and combine user configurations 411, and by combining personalized configurations of different users, the front-end plugin may be adapted to different application scenarios.

For example, the operation logic 412 of the front-end plugin 401 refers to that data prefetch 413 can be realized, that is, data required for rendering is acquired in advance, and after a webpage is rendered, the page is returned to the client.

Figure 5:
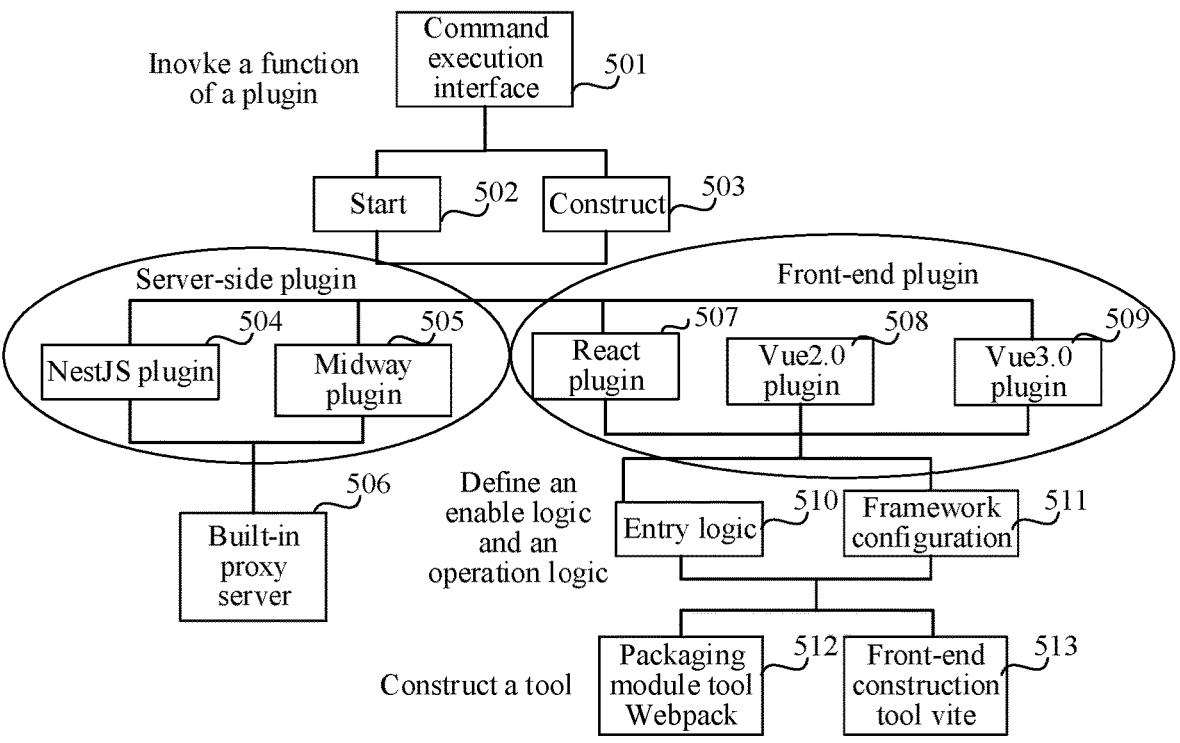
FIG. 5 is a schematic diagram of an overall structural framework including a front-end plugin and a server-side plugin according to an embodiment of this application.

In some embodiments, FIG. 5 is a schematic diagram of an overall structural framework including a front-end plugin and a server-side plugin. All function interfaces of the plugins are displayed on a command execution interface 501, the server-side plugin and/or the front-end plugin may be edited by clicking on "start" 502, after the server-side plugin and/or the front-end plugin are edited, the operation may be completed by clicking on "construct" 503, and the plugins are published.

The front-end framework refers to a front-end framework with a customized instruction function. For example, a front-end plugin corresponding to an insertable front-end framework includes, but is not limited to, any one of a World-Wide-Web development framework React plugin 507, a progressive front-end framework Vue2.0 plugin 508, and a progressive front-end framework Vue3.0 plugin 509, which is not defined herein.

In some embodiments, an entry logic 510 of the front-end framework includes an operation logic and an enable logic of the front-end plugin, a specific description of the operation logic and the enable logic refers to the description in FIG. 4, and a specific description of a framework configuration capacity 511 of the front-end plugin refers to the description in FIG. 4, which is not described in detail here.

In some embodiments, the front-end framework supports, but is not limited to, a packaging module tool Webpack 512 and a front-end construction tool vite 513, which is not defined herein.

The back-end framework refers to a back-end framework with a customized instruction function. For example, a server-side plugin corresponding to an insertable back-end framework includes, but is not limited to, a NestJS development framework plugin 504, a Midway development framework plugin 505, and the like. The server-side plugin includes a built-in proxy server 506, so that all functions required in the server-side plugin may be directly performed without arranging an additional proxy server.

Step 304: Request, in response to an open operation for a webpage, a server-side plugin to render a webpage source code of the webpage through the front-end plugin.

The webpage source code refers to a human-readable text written in a specific programming language, and may represent elements (such as pictures, videos, music, and characters) on a webpage as a standard language.

In some embodiments, the client transmits, in response to the open operation for the webpage, a client request to the server-side plugin through the front-end plugin, and the client request carries an application layer protocol information parameter.

The client request is used for requesting the server-side plugin to render the webpage source code of the webpage, and the application layer protocol information parameter is used for instructing the server-side plugin to determine a rendering mode of the webpage.

In some embodiments, the rendering mode includes a server-side rendering mode and a client-side rendering mode, the server-side rendering mode refers to that rendering of the webpage source code of the webpage is mainly performed at the server side, and the client-side rendering mode refers to that rendering of the webpage source code of the webpage is mainly performed at the client side.

In some embodiments, the application layer protocol information parameter refers to a parameter that is carried in the client request and used for determining a rendering mode, and includes, but is not limited to, at least one of a request query parameter (query), a request header (header), and request header information (cookie), which is not defined herein.

For example, a situation where the application layer protocol information parameter in the client request is a request header (header) is taken as an example, an information form of the request header (header) is request.headers ['csr'], and the server-side plugin determines a rendering mode of the webpage based on read information of the request header (header). For example, in a case of csr=1, the rendering mode of the webpage is the server-side rendering mode; and in a case of csr≠1, the rendering mode of the webpage is the client-side rendering mode. The method for determining a rendering mode of the webpage is not limited to the foregoing method, and is not specifically defined herein.

Step 306: Receive a rendering result of the webpage sent back by the server-side plugin through the front-end plugin.

After the client transmits a Uniform Resource Locator (URL) for requesting a page resource to the server, the server-side plugin in the server acquires a webpage source code of a webpage according to the URL and renders the webpage source code of the webpage, the server sends back a rendering result of the webpage to the client after the rendering is completed, and the client receives the rendering result of the webpage sent back by the server-side plugin through the front-end plugin.

Based on the above, according to the method provided in this embodiment, the front-end plugin is operated in the front-end application, a rendering mode of a webpage is determined according to an application layer protocol information parameter in a client request transmitted to the server-side plugin through the front-end plugin in response to an open operation for the webpage, and a rendering result of the webpage sent back by the server-side plugin is received through the front-end plugin. According to some embodiments of this application, rendering of a webpage is realized by inserting plugins into a front-end framework and a back-end framework, the front-end plugin completes the rendering of the webpage by receiving a rendering result of the webpage sent back by the server-side plugin, and the front-end framework inserted with the front-end plugins may be applied to a variety of front-end framework scenarios through different front-end plugins.

FIG. 6 is a flowchart of a webpage rendering method according to an embodiment of this application. The method may be applied to a computer device to realize rendering of a webpage. The foregoing computer device may be client 160 in the system shown in FIG. 1. The method includes the following steps.

Step 602: Operate a front-end plugin in a front-end application, the front-end plugin being uncoupled from a server-side plugin operated in a server.

A front end refers to a foreground part of a website, and is operated on a browser at a personal computer (PC) side, a mobile side or the like to display a webpage for a user to browse.

The front-end plugin refers to a plugin with a customized instruction function and is configured to provide a webpage rendering function at a client side. The server-side plugin refers to a plugin with a customized instruction function and is configured to provide a webpage rendering function at a server side. The front-end plugin and the server-side plugin cooperatively complete a whole rendering process of a webpage.

Webpage rendering refers to a process of converting source code corresponding to page objects in a webpage into a visual image.

A front-end framework refers to a front-end framework with a customized instruction function, such as the World-Wide-Web development framework React, the progressive front-end framework Vue2.0, and the progressive front-end framework Vue3.0. These frameworks encapsulate some basic functions such as HTML document manipulation and various controls (such as a button and a form).

In some embodiments, a front-end plugin corresponding to a front-end framework used by the front-end application is operated in the front-end application. Front-end plugins corresponding to different front-end frameworks have the same operation logic and different adaptive designs. That is, by replacing different plugins, the webpage rendering process may be applied to a variety of front-end framework scenarios.

In some embodiments, different front-end frameworks include at least two of the World-Wide-Web development framework React, the progressive front-end framework Vue2.0, and the progressive front-end framework Vue3.0.

Uncoupled refers to that a type of the front-end plugin is unrelated to a type of the server-side plugin. The front-end plugin and the server-side plugin may be arbitrarily combined. In some embodiments, the front-end plugin is any one of a World-Wide-Web development framework React plugin, a progressive front-end framework Vue2.0 plugin, and a progressive front-end framework Vue3.0 plugin. The server-side plugin is any one of a NestJS development framework plugin and a Midway development framework plugin. The front-end plugin is uncoupled from the server-side plugin, so that the webpage rendering method of this application may be applied to all development scenarios.

Step 604: Request, in response to an open operation for a webpage, the server-side plugin to render a webpage source code of the webpage through the front-end plugin.

In some embodiments, the client transmits, in response to the open operation for the webpage, a client request to the server-side plugin through the front-end plugin, and the client request carries an application layer protocol information parameter.

The client request is used for requesting the server-side plugin to render the webpage source code of the webpage, and the application layer protocol information parameter is used for instructing the server-side plugin to determine a rendering mode of the webpage.

In some embodiments, the rendering mode includes a server-side rendering mode and a client-side rendering mode, the server-side rendering mode refers to that rendering of the webpage source code of the webpage is mainly performed at the server side, and the client-side rendering mode refers to that rendering of the webpage source code of the webpage is mainly performed at the client side.

Step 606: Receive a degraded rendering result sent back by the server-side plugin through the front-end plugin.

The webpage source code of the webpage includes a page layout layer code (that is, a layout layer code) and a page content presentation layer code (that is, a children layer code), the page layout layer code is a code unrelated to an application logic in the webpage source code, and the page content presentation layer code is a code related to the application logic in the webpage source code.

The degraded rendering result refers to a rendering result obtained by the server-side plugin by rendering the page layout layer code in a case that the server-side plugin fails to render the webpage source code.

For example, the page layout layer code includes, but is not limited to, at least one of a title information code of a page, a page description code of a page title, and a static resource file address generation logic code of the page, which is not defined herein.

After the client transmits a Uniform Resource Locator for requesting a page resource to the server, the server-side plugin in the server acquires a webpage source code of a webpage according to the URL and renders the webpage source code of the webpage, the server sends back a degraded rendering result of the webpage to the client after the rendering fails, and the client receives the degraded rendering result of the webpage sent back by the server-side plugin through the front-end plugin, that is, the client receives a rendering result obtained by the server-side plugin by rendering a page layout layer code that is sent back by the server-side plugin through the front-end plugin.

FIG. 7 is a schematic diagram of a rendering mode degradation process framework, the client transmits a client request 701 to the server-side plugin through the front-end plugin, the client request 701 carries an application layer protocol information parameter, and a rendering mode of a webpage is determined according to the application layer protocol information parameter. In a case that the rendering mode of the webpage is a server-side rendering mode 702, the server-side plugin acquires a page layout layer code and renders the page layout layer code 703, and then acquires a page content presentation layer code and renders the page content presentation layer code 704, that is, renders page content related to an application logic, to finally obtain a rendering result of the webpage.

In a case that the server-side plugin fails to render the page content presentation layer code, that is, in a case that an error occurs during operation of the server-side plugin or during loading of data, the rendering mode of the webpage is degraded from the server-side rendering mode 702 to a client-side rendering mode 705, the server takes a rendering result obtained by the server-side plugin by rendering the page layout layer code as a degraded rendering result, and the front-end plugin further renders the degraded rendering result, that is, the client performs further rendering on the basis of the page layout layer code 706 rendered by the server.

Step 608: Perform client-side rendering based on the degraded rendering result through the front-end plugin to obtain a rendering result of the webpage.

In some embodiments, the client acquires the page content presentation layer code from the server through the front-end plugin. The client renders, by taking the degraded rendering result as a rendered skeleton, page content related to the application logic in the rendered skeleton based on the page content presentation layer code through the front-end plugin to obtain a rendering result of the webpage.

Figure 8:
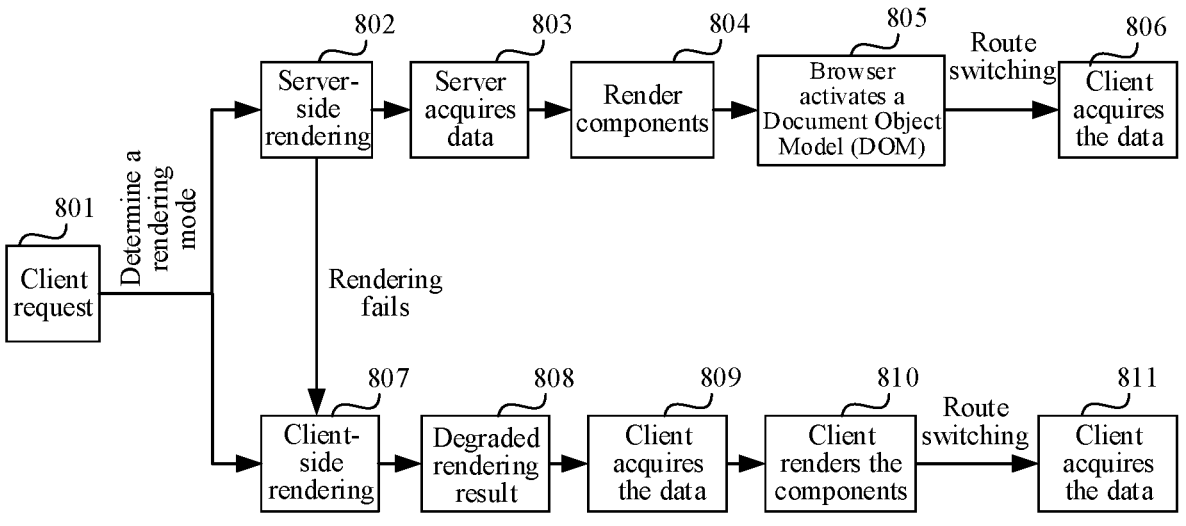
FIG. 8 is a schematic diagram of a rendering mode degradation process framework according to an embodiment of this application.

FIG. 8 is a schematic diagram of a rendering mode degradation process framework, a browser is taken as an example, the client transmits, in response to an open operation for a webpage on the browser, a client request 801 to the server-side plugin through the front-end plugin, the client request 801 carries an application layer protocol information parameter, and a rendering mode of the webpage is determined according to the application layer protocol information parameter. In a case that the rendering mode of the webpage is a server-side rendering mode 802, the server acquires data 803, that is, the server-side plugin acquires a page layout layer code and a page content presentation layer code, renders page components in the webpage 804, that is, renders the page layout layer code and the page content presentation layer code, to obtain a rendering result of the webpage, and transmits the rendering result of the webpage to the browser in the client, and the browser activates a Document Object Model (DOM) 805 and performs route switching in response to the open operation for the webpage on the browser, that is, jumps to the webpage, so that the client acquires the data 806, that is, the client displays the acquired rendering result on the webpage of the browser. The Document Object Model (DOM) refers to a tree-structured model composed of page objects in a webpage and relationships between the page objects.

In a case that an error occurs when the server-side plugin renders the page content presentation layer code, that is, in a case that an error occurs during operation of the server-side plugin or during loading of data and the server-side plugin fails to render the webpage source code of the webpage, the rendering mode of the webpage is degraded from the server-side rendering mode 802 to a client-side rendering mode 807, the server takes a rendering result obtained by the server-side plugin by rendering the page layout layer code as a degraded rendering result, and the front-end plugin further renders the degraded rendering result 808. The client acquires, by taking the degraded rendering result as a rendered skeleton, the data 809 through the front-end plugin, that is, the client acquires the page content presentation layer code from the server through the front-end plugin, and renders page content related to an application logic in the rendered skeleton based on the page content presentation layer code. That is, the client renders the page components in webpage 810, and performs route switching, that is, jumps to the webpage, so that the client acquires the data 811 and displays the rendering result on the webpage of the browser.

Based on the above, according to the method provided in this embodiment, the front-end plugin is operated in the front-end application, a rendering mode of a webpage is determined according to an application layer protocol information parameter in a client request transmitted to the server-side plugin through the front-end plugin in response to an open operation for the webpage, the rendering mode is degraded from a server-side rendering mode to a client-side rendering mode in a case that the server-side plugin fails to render a webpage source code of the webpage, and the front-end plugin performs client-side rendering based on a degraded rendering result to finally obtain a rendering result of the webpage. According to some embodiments of this application, server-side rendering of a webpage is realized by inserting plugins into a front-end framework and a back-end framework, and a rendering mode can be quickly switched in a case of failed server-side rendering to ensure normal operation of webpage rendering.

Figure 9:
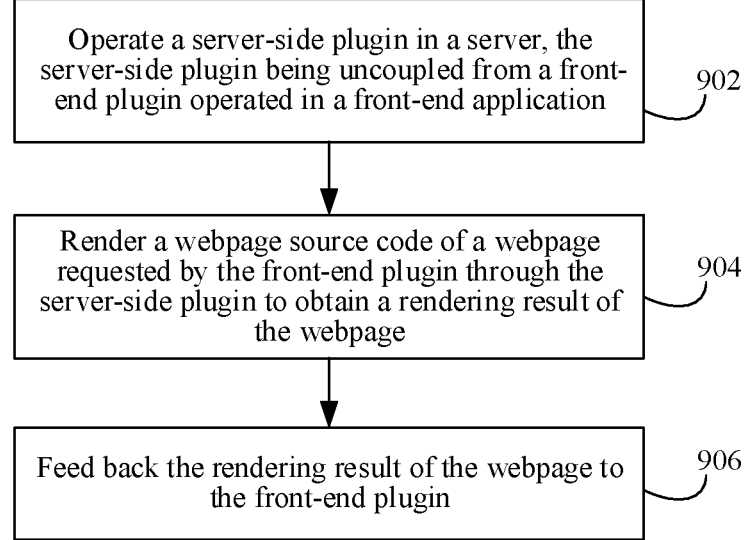
FIG. 9 is a flowchart of a webpage rendering method according to an embodiment of this application.

FIG. 9 is a flowchart of a webpage rendering method according to an embodiment of this application. The method may be applied to a computer device to realize rendering of a webpage. The foregoing computer device may be the server 120 in the system shown in FIG. 1. The method includes the following steps.

Step 902: Operate a server-side plugin in a server, the server-side plugin being uncoupled from a front-end plugin operated in a front-end application.

A front end refers to a foreground part of a website, and is operated on a browser at a personal computer (PC) side, a mobile side or the like to display a webpage for a user to browse.

The front-end plugin refers to a plugin with a customized instruction function and is configured to provide a webpage rendering function at a client side. The server-side plugin refers to a plugin with a customized instruction function and is configured to provide a webpage rendering function at a server side. The front-end plugin and the server-side plugin cooperatively complete a whole rendering process of a webpage.

Webpage rendering refers to a process of converting source codes corresponding to page objects in a webpage into a visual image.

The page objects refer to objects with various granularities in the webpage that may be controlled by the front-end plugin alone. For example, in a page, the page itself may be taken as a page object, each page component included in the page may also be taken as a separate page object, and a page element included in each page component may also be taken as a separate page object.

In some embodiments of this application, the page object may be a current page itself, or the page object may be a certain page component in the current page, or the foregoing page object may be an element in the certain page component in the current page.

The foregoing page component is a container for encapsulating one or more elements. For example, the page component may be an input box or a drop-down box in a page. In some embodiments, in a case that the foregoing page is a webpage, the page component may be a webpage component or a web component.

Uncoupled refers to that a type of the front-end plugin is unrelated to the type of the server-side plugin. The front-end plugin and the server-side plugin may be arbitrarily combined. In some embodiments, the front-end plugin is any one of a World-Wide-Web development framework React plugin, a progressive front-end framework Vue2.0 plugin, and a progressive front-end framework Vue3.0 plugin. The server-side plugin is any one of a NestJS development framework plugin and a Midway development framework plugin. The front-end plugin is uncoupled from the server-side plugin, so that the webpage rendering method of this application may be applied to all development scenarios.

Step 904: Render a webpage source code of a webpage requested by the front-end plugin through the server-side plugin to obtain a rendering result of the webpage.

The webpage source code refers to a human-readable text written in a specific programming language, and may represent elements (such as pictures, videos, music, and characters) on a webpage as a standard language.

In some embodiments, the client requests a page resource from the server, and the server-side plugin acquires the webpage source code of the webpage requested by the front-end plugin, and renders the webpage source code of the webpage to obtain a rendering result of the webpage.

Step 906: Send back the rendering result of the webpage to the front-end plugin.

The server-side plugin in the server acquires the webpage source code of the webpage and renders the webpage source code of the webpage, the server sends back a rendering result of the webpage to the client after the rendering is completed, and the client receives the rendering result of the webpage sent back by the server-side plugin through the front-end plugin.

Based on the above, according to the method provided in this embodiment, the server-side plugin is operated in the server, a webpage source code of a webpage requested by the front-end plugin is rendered through the server-side plugin to obtain a rendering result of the webpage, and the rendering result of the webpage is sent back to the front-end plugin. According to some embodiments of this application, server-side rendering of a webpage is realized by inserting plugins into a front-end framework and a back-end framework, the server-side plugin renders a webpage source code of a webpage requested by the front-end plugin, and the back-end framework inserted with the server-side plugins enables server-side rendering to be applied to a variety of rendering scenarios through different plugins.

Figure 10:
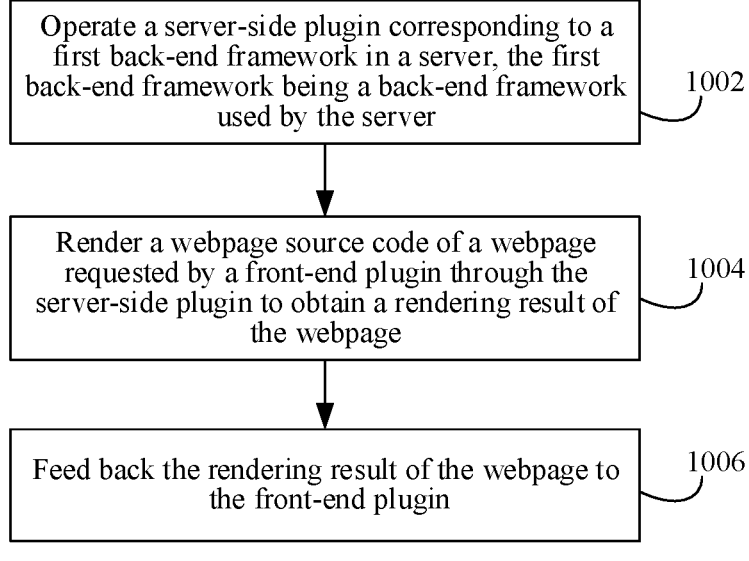
FIG. 10 is a flowchart of a webpage rendering method according to an embodiment of this application.

FIG. 10 is a flowchart of a webpage rendering method according to an embodiment of this application. The method may be applied to a computer device to realize rendering of a webpage. The foregoing computer device may be the server 120 in the system shown in FIG. 1. The method includes the following steps.

Step 1002: Operate a server-side plugin corresponding to the first back-end framework in a server, the first back-end framework being a back-end framework used by the server.

The first back-end framework is a back-end framework used by the server. Server-side plugins corresponding to different back-end frameworks have the same operation logic and different adaptive designs.

The server-side plugin refers to a plugin with a customized instruction function and is configured to provide a webpage rendering function at a server side.

Webpage rendering refers to a process of converting source code corresponding to page objects in a webpage into a visual image.

The back-end framework refers to a back-end framework with a customized instruction function, such as a NestJS development framework and a Midway development framework. These frameworks encapsulate some basic functions.

Step 1004: Render a webpage source code of a webpage requested by a front-end plugin through the server-side plugin to obtain a rendering result of the webpage.

The webpage source code refers to a human-readable text written in a specific programming language, and may represent elements (such as pictures, videos, music, and characters) on a webpage as a standard language.

In some embodiments, the server receives a client request transmitted by the front-end plugin through the server-side plugin, and the client request carries an application layer protocol information parameter.

The server-side plugin determines the rendering mode of the webpage according to the application layer protocol information parameter.

The server-side plugin renders the webpage source code of the webpage based on the rendering mode to obtain a rendering result of the webpage.

The client request is used for requesting the server-side plugin to render the webpage source code of the webpage, and the application layer protocol information parameter is used for instructing the server-side plugin to determine a rendering mode of the webpage.

In some embodiments, the rendering mode includes a server-side rendering mode and a client-side rendering mode, the server-side rendering mode refers to that rendering of the webpage source code of the webpage is mainly performed at the server side, and the client-side rendering mode refers to that rendering of the webpage source code of the webpage is mainly performed at the client side.

In some embodiments, the application layer protocol information parameter refers to a parameter that is carried in the client request and used for determining a rendering mode, and includes, but is not limited to, at least one of a request query parameter (query), a request header (header), and request header information (cookie), which is not defined herein.

Step 1006: Send back the rendering result of the webpage to the front-end plugin.

The server-side plugin in the server acquires the webpage source code of the webpage and renders the webpage source code of the webpage, and the server sends back a rendering result of the webpage to the client after the rendering is completed. The front-end plugin and the server-side plugin cooperatively complete a whole rendering process of a webpage.

Based on the above, according to the method provided in this embodiment, the server-side plugin is operated in the server, a client request transmitted by the front-end plugin is received through the server-side plugin, a rendering mode of a webpage is determined according to an application layer protocol information parameter in the received client request, a webpage source code of the webpage is rendered based on the rendering mode to obtain a rendering result of the webpage, and the rendering result of the webpage is sent back to the client. According to some embodiments of this application, server-side rendering of a webpage is realized by inserting plugins into a front-end framework and a back-end framework, the server-side plugin renders a webpage source code of a webpage requested by the front-end plugin, and the back-end framework inserted with the server-side plugins enables server-side rendering to be applied to a variety of rendering scenarios through different plugins.

Figure 11:
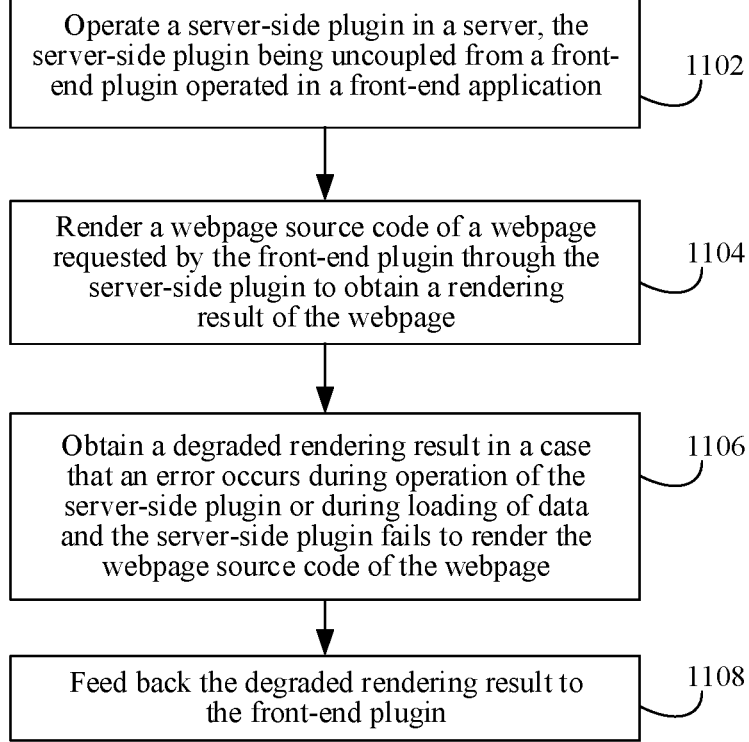
FIG. 11 is a flowchart of a webpage rendering method according to an embodiment of this application.

FIG. 11 is a flowchart of a webpage rendering method according to an embodiment of this application. The method may be applied to a computer device to realize rendering of a webpage. The foregoing computer device may be the server 120 in the system shown in FIG. 1. The method includes the following steps.

Step 1102: Operate a server-side plugin in a server, the server-side plugin being uncoupled from a front-end plugin operated in a front-end application.

A front end refers to a foreground part of a website, and is operated on a browser at a personal computer (PC) side, a mobile side or the like to display a webpage for a user to browse.

The front-end plugin refers to a plugin with a customized instruction function and is configured to provide a webpage rendering function at a client side. The server-side plugin refers to a plugin with a customized instruction function and is configured to provide a webpage rendering function at a server side. The front-end plugin and the server-side plugin cooperatively complete a whole rendering process of a webpage.

Webpage rendering refers to a process of converting source code corresponding to page objects in a webpage into a visual image.

The front-end framework refers to a front-end framework with a customized instruction function, such as the World-Wide-Web development framework React, the progressive front-end framework Vue2.0, and the progressive front-end framework Vue3.0. These frameworks encapsulate some basic functions such as HTML document manipulation and various controls (such as a button and a form).

The back-end framework refers to a back-end framework with a customized instruction function, such as a NestJS development framework and a Midway development framework. These frameworks encapsulate some basic functions.

In some embodiments, a front-end plugin corresponding to a front-end framework used by the front-end application is operated in the front-end application. Front-end plugins corresponding to different front-end frameworks have the same operation logic and different adaptive designs. That is, by replacing different plugins, the webpage rendering process may be applied to a variety of front-end framework scenarios.

In some embodiments, different front-end frameworks include at least two of the World-Wide-Web development framework React, the progressive front-end framework Vue2.0, and the progressive front-end framework Vue3.0.

"Uncoupled" refers to that a type of the front-end plugin is unrelated to the type of the server-side plugin. The front-end plugin and the server-side plugin may be arbitrarily combined. In some embodiments, the front-end plugin is any one of a World-Wide-Web development framework React plugin, a progressive front-end framework Vue2.0 plugin, and a progressive front-end framework Vue3.0 plugin. The server-side plugin is any one of a NestJS development framework plugin and a Midway development framework plugin. The front-end plugin is uncoupled from the server-side plugin, so that the webpage rendering method of this application may be applied to all development scenarios.

Step 1104: Render a webpage source code of a webpage requested by the front-end plugin through the server-side plugin to obtain a rendering result of the webpage.

The webpage source code refers to a human-readable text written in a specific programming language, and may represent elements (such as pictures, videos, music, and characters) on a webpage as a standard language.

In some embodiments, the server receives a client request transmitted by the front-end plugin through the server-side plugin, and the client request carries an application layer protocol information parameter.

The server-side plugin determines the rendering mode of the webpage according to the application layer protocol information parameter.

The server-side plugin renders the webpage source code of the webpage based on the rendering mode to obtain a rendering result of the webpage.

The client request is used for requesting the server-side plugin to render the webpage source code of the webpage, and the application layer protocol information parameter is used for instructing the server-side plugin to determine a rendering mode of the webpage.

In some embodiments, the rendering mode includes a server-side rendering mode and a client-side rendering mode, the server-side rendering mode refers to that rendering of the webpage source code of the webpage is mainly performed at the server side, and the client-side rendering mode refers to that rendering of the webpage source code of the webpage is mainly performed at the client side.

Step 1106: Obtain a degraded rendering result in a case that an error occurs during operation of the server-side plugin or during loading of data and the server-side plugin fails to render the webpage source code of the webpage.

The webpage source code of the webpage includes a page layout layer code (that is, a layout layer code) and a page content presentation layer code (that is, a children layer code), the page layout layer code is a code unrelated to an application logic in the webpage source code, and the page content presentation layer code is a code related to the application logic in the webpage source code.

The degraded rendering result refers to a rendering result obtained by the server-side plugin by rendering the page layout layer code in a case that the server-side plugin fails to render the webpage source code.

For example, the page layout layer code includes, but is not limited to, at least one of a title information code of a page, a page description code of a page title, and a static resource file address generation logic code of the page, which is not defined herein.

After acquiring a client request transmitted by the client to the server, the server-side plugin in the server acquires a webpage source code of a webpage and renders the webpage source code of the page, and the server takes a rendering result obtained by rendering a current page layout layer code as a degraded rendering result after the rendering fails.

Step 1108: Send back the degraded rendering result to the front-end plugin.

In some embodiments, the server-side plugin in the server acquires the webpage source code of the webpage and renders the webpage source code of the webpage, and the server sends back a degraded rendering result of the webpage to the client after the rendering fails.

Based on the above, according to the method provided in this embodiment, the server-side plugin is operated in the server, a rendering mode of a webpage is determined according to an application layer protocol information parameter in a received client request, the rendering mode is degraded from a server-side rendering mode to a client-side rendering mode in a case that the server-side plugin fails to render a webpage source code of the webpage, and a degraded rendering result of the webpage is sent back to the client for further rendering. According to some embodiments of this application, rendering of a webpage is realized by inserting plugins into a front-end framework and a back-end framework, and a rendering mode can be quickly switched in a case of failed server-side rendering to ensure normal operation of webpage rendering.

Figure 12:
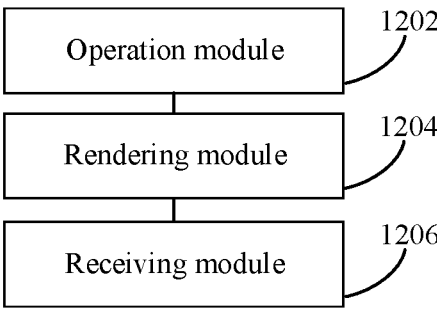
FIG. 12 is a block diagram of a webpage rendering apparatus according to an embodiment of this application.

FIG. 12 is a block diagram of a webpage rendering apparatus according to an embodiment of this application. The apparatus includes:

an operation module 1202, configured to operate a front-end plugin in a front-end application, the front-end plugin being uncoupled from a server-side plugin operated in a server, and the server-side plugin being configured to provide a webpage rendering function at a server side;

a rendering module 1204, configured to request, in response to an open operation for a webpage, the server-side plugin to render a webpage source code of the webpage through the front-end plugin; and a receiving module 1206, configured to receive a rendering result of the webpage sent back by the server-side plugin through the front-end plugin.

In one embodiment, the operation module 1202 is further configured to operate a front-end plugin corresponding to a first front-end framework in the front-end application, the first front-end framework being a front-end framework used by the front-end application. Front-end plugins corresponding to different front-end frameworks have the same operation logic and different adaptive designs.

In one embodiment, the rendering module 1204 is further configured to transmit, in response to the open operation for the webpage, a client request to the server-side plugin through the front-end plugin, the client request carrying an application layer protocol information parameter.

The client request is used for requesting the server-side plugin to render the webpage source code of the webpage, and the application layer protocol information parameter is used for instructing the server-side plugin to determine a rendering mode of the webpage.

In one embodiment, the receiving module 1206 is further configured to receive a degraded rendering result sent back by the server-side plugin through the front-end plugin, the degraded rendering result being a rendering result obtained in a case that the server-side plugin fails to render the webpage source code of the webpage.

In one embodiment, the rendering module 1204 is further configured to perform client-side rendering based on the degraded rendering result through the front-end plugin to obtain a rendering result of the webpage.

The webpage source code of the webpage includes a page layout layer code and a page content presentation layer code, the page layout layer code is a code unrelated to an application logic in the webpage source code, and the page content presentation layer code is a code related to the application logic in the webpage source code.

The degraded rendering result is a rendering result obtained by the server-side plugin by rendering the page layout layer code.

In one embodiment, the rendering module 1204 is further configured to acquire the page content presentation layer code from the server through the front-end plugin, and render, by taking the degraded rendering result as a rendered skeleton, page content related to the application logic in the rendered skeleton based on the page content presentation layer code through the front-end plugin to obtain a rendering result of the webpage.

Figure 13:
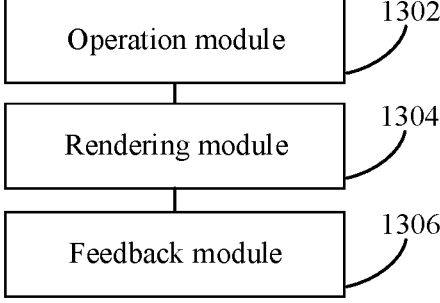
FIG. 13 is a block diagram of a webpage rendering apparatus according to an embodiment of this application.

FIG. 13 is a block diagram of a webpage rendering apparatus according to an embodiment of this application. The apparatus includes:

an operation module 1302, configured to operate a server-side plugin in a server, the server-side plugin being uncoupled from a front-end plugin operated in a front-end application, and the server-side plugin being configured to provide a webpage rendering function at a server side;

a rendering module 1304, configured to render a webpage source code of a webpage requested by the front-end plugin through the server-side plugin to obtain a rendering result of the webpage; and a feedback module 1306, configured to send back the rendering result of the webpage to the front-end plugin.

In one embodiment, the operation module is further configured to operate a server-side plugin corresponding to a first back-end framework in the server, the first back-end framework being a back-end framework used by the server.

Server-side plugins corresponding to different back-end frameworks have the same operation logic and different adaptive designs.

In one embodiment, the rendering module 1304 is further configured to receive a client request transmitted by the front-end plugin through the server-side plugin, the client request carrying an application layer protocol information parameter, determine a rendering mode of the webpage according to the application layer protocol information parameter, and render the webpage source code of the webpage based on the rendering mode to obtain a rendering result of the webpage.

In one embodiment, the sendback module 1306 is further configured to obtain a degraded rendering result in a case that an error occurs during operation of the server-side plugin or during loading of data and the server-side plugin fails to render the webpage source code of the webpage, and send back the degraded rendering result to the front-end plugin.

The webpage source code of the webpage includes a page layout layer code and a page content presentation layer code, the page layout layer code is a code unrelated to an application logic in the webpage source code, and the page content presentation layer code is a code related to the application logic in the webpage source code. The degraded rendering result is obtained by the server-side plugin by rendering the page layout layer code.

Figure 14:
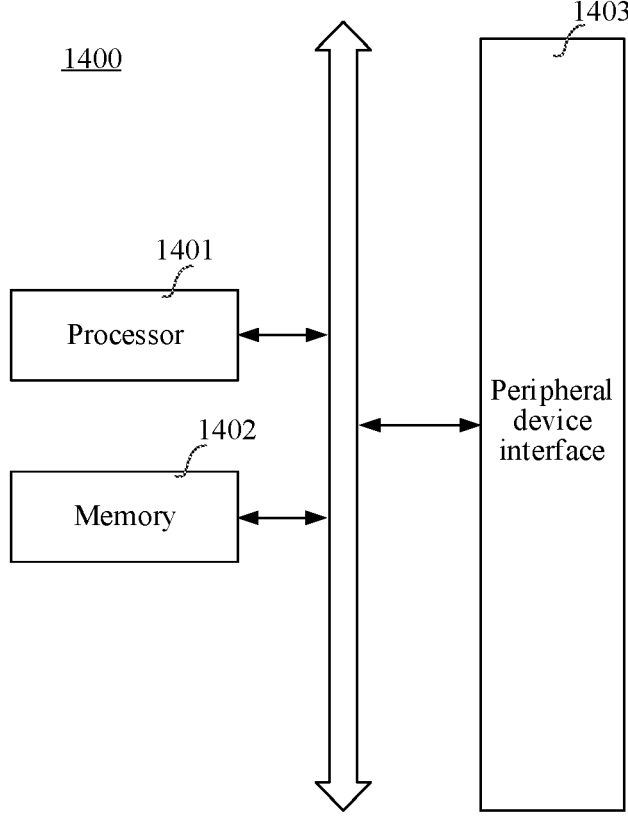
FIG. 14 is a schematic structural diagram of a computer device according to an embodiment of this application.

FIG. 14 is a schematic structural diagram of a computer device 1400 according to an embodiment of this application. The computer device 1400 may be a portable mobile terminal such as a smart phone, a tablet computer, a moving picture experts group audio layer III (MP3) player, and a moving picture experts group audio layer IV (MP4) player. The computer device 1400 may also be referred to as another name such as user equipment and a portable terminal.

Usually, the computer device 1400 includes: a processor 1401 and a memory 1402.

The processor 1401 may include one or more processing cores, such as a 4-core processor and an 8-core processor. The processor 1401 may be implemented in at least one hardware form of a digital signal processor (DSP), a field-programmable gate array (FPGA), and a programmable logic array (PLA). The processor 1401 may also include a main processor and a co-processor. The main processor is a processor configured to process data in an awake state, and is also referred to as a central processing unit (CPU). The co-processor is a low power processor configured to process data in a standby state. In some embodiments, the processor 1401 may be integrated with a graphics processing unit (GPU). The GPU is configured to render and draw content that needs to be displayed on a display screen. In some embodiments, processor 1401 may further include an artificial intelligence (AI) processor. The AI processor is configured to process computing operations related to machine learning.

Memory 1402 may include one or more computer-readable storage media. The computer-readable storage medium may be tangible and non-transient. Memory 1402 may further include a high-speed random access memory and a non-volatile memory, such as one or more disk storage devices and flash storage devices. In some embodiments, the non-transient computer-readable storage medium in the memory 1402 is configured to store at least one instruction that, when executed by the processor 1401, implements the webpage rendering method according to some embodiments of this application.

In some embodiments, the computer device 1400 further In some embodiments includes: a peripheral device interface 1403 and at least one peripheral device. Those skilled in the art may understand that the structure shown in FIG. 14 does not constitute a limitation to the computer device 1400, and the computer device may include more or fewer components than those shown in the figure, or some components may be combined, or a different component deployment may be used.

Figure 15:
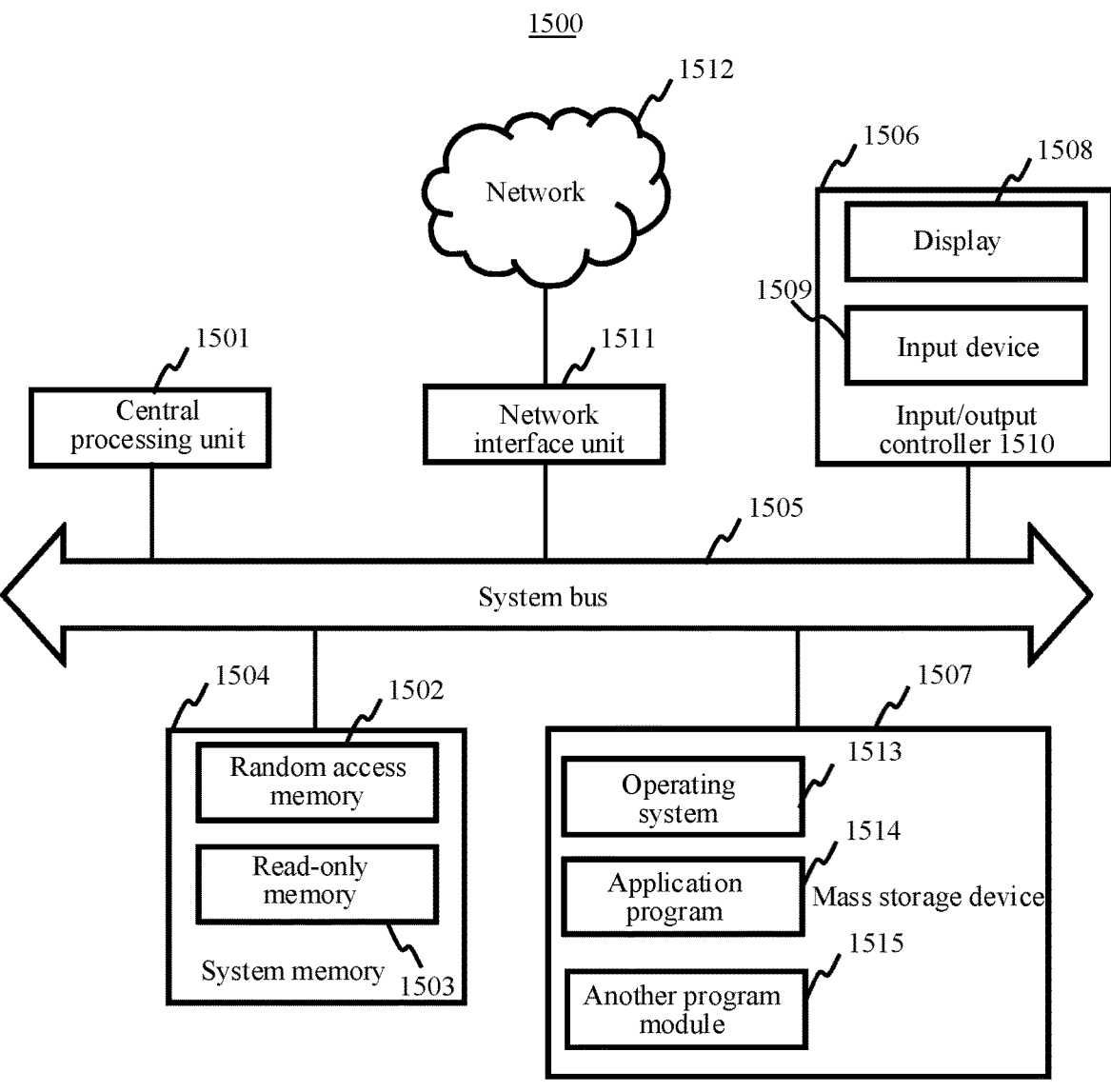
FIG. 15 is a schematic structural diagram of a computer device according to an embodiment of this application.

FIG. 15 is a schematic structural diagram of a computer device according to an embodiment of this application. The computer device may be server 120 in the embodiment shown in FIG. 1. Specifically, the computer device 1500 includes a central processing unit (CPU) 1501, a system memory 1504 including a random access memory (RAM) 1502 and a read-only memory (ROM) 1503, and a system bus 1505 connecting the system memory 1504 to the CPU 1501. The computer device 1500 further includes a basic input/output (I/O) system 1506 assisting in transmitting information between components in the computer, and a mass storage device 1507 configured to store an operating system 1513, an application program 1514, and another program module 1515.

The basic I/O system 1506 includes a display 1508 configured to display information and an input device 1509 used by a user to input information, such as a mouse and a keyboard. The display 1508 and the input device 1509 are both connected to the CPU 1501 by using an input/output controller 1510 connected to the system bus 1505. The basic I/O system 1506 may further include the input and output controller 1510 configured to receive and process inputs from a plurality of other devices such as a keyboard, a mouse, and an electronic stylus. Similarly, the input/output controller 1510 further provides an output to a display screen, a printer, or another type of output device.

The mass storage device 1507 is connected to the CPU 1501 by using a mass storage controller (not shown) connected to the system bus 1505. The mass storage device 1507 and a computer-readable medium associated with the mass storage device provide non-volatile storage for the computer device 1500. That is, the mass storage device 1507 may include a computer-readable storage medium (not shown) such as a hard disk drive or a compact disc read-only memory (CD-ROM) driver.

The computer-readable storage medium may include a computer storage medium and a communication medium. The computer storage medium includes volatile and non-volatile media, and removable and non-removable media implemented by any method or technology for storing information such as computer-readable instructions, data structures, program modules, or other data. The computer storage medium includes an RAM, an ROM, an erasable programmable read-only memory (EPROM), an electrically erasable programmable read-only memory (EEPROM), a flash memory or other solid-state memory technologies, a CD-ROM, a digital video disk (DVD) or other optical memories, a tape cartridge, a magnetic tape, a magnetic disk memory, or other magnetic storage devices. Certainly, those skilled in the art may learn that the computer storage medium is not limited to the foregoing several types. The foregoing system memory 1504 and mass storage device 1507 may be collectively referred to as a memory.

The memory stores one or more programs executed by one or more CPUs 1501. The one or more programs include instructions used for implementing the foregoing webpage rendering method, and the CPU 1501 executes the one or more programs to implement the webpage rendering method according to the method embodiments.

According to some embodiments of this application, the computer device 1500 may further be connected, through a network such as the Internet, to a remote computer on the network for operation. That is, the computer device 1500 may be connected to a network 1512 through a network interface unit 1511 connected to the system bus 1505, or may be connected to another type of network or a remote computer system (not shown) through the network interface unit 1511.

The memory further includes one or more programs. The one or more programs are stored in the memory and include instructions used for performing the steps, performed by a server, in the webpage rendering method according to some embodiments of this application.

Some embodiments of this application further provide a computer device, which includes: a processor and a memory. The memory stores at least one piece of instruction that, when loaded and executed by the processor, implements the webpage rendering method according to the foregoing method embodiments.

Some embodiments of this application further provide a computer-readable storage medium, which stores at least one computer program that, when loaded and executed by a processor, implements the webpage rendering method according to the foregoing method embodiments.

Some embodiments of this application provide a computer program product, which includes a computer instruction. The computer instruction is stored in a computer-readable storage medium, and a processor of a computer device reads the computer instruction from the computer-readable storage medium and executes the computer instruction to cause the computer device to perform the webpage rendering method according to the foregoing method embodiments.

What is claimed is:

1. A webpage rendering method, performed by a terminal and comprising:

operating a front-end plugin in a front-end application, a type of a development framework of the front-end plugin being uncoupled from and unrelated to a type of a development framework of a server-side plugin, and the server-side plugin being configured to provide a webpage rendering function at a server side;

requesting the server-side plugin to render a webpage source code of the webpage through the front-end plugin in response to an open operation for a webpage, wherein the webpage source code of the webpage comprises a page layout layer code and a page content presentation layer code, the page layout layer code is unrelated to an application logic, and the page content presentation layer code is related to the application logic; and receiving a rendering result of the webpage sent by the server-side plugin through the front-end plugin, comprising:

in response to the server-side plugin succeeds in rendering the webpage source code, receiving the rendering result of the webpage obtained from rendering both the page layout layer code and the page content presentation layer code through the server-side plugin; and in response to the server-side plugin fails to render the webpage source code, receiving a degraded rendering result, and performing client-side rendering through the front-end plugin to obtain the rendered webpage, wherein the degraded rendering result comprises a rendered skeleton obtained from rendering the page layout layer code through the server-side plugin, and the page content presentation layer code is rendered by the front-end plugin based on the degraded rendering result.

2. The method according to claim 1, wherein the operating a front-end plugin in a front-end application comprises:

operating a front-end plugin corresponding to a first front-end framework in the front-end application, and front-end plugins corresponding to different front-end frameworks have the same operation logic and different adaptive designs.

3. The method according to claim 2, wherein the requesting the server-side plugin to render a webpage source code of the webpage through the front-end plugin in response to an open operation for a webpage, comprises:

transmitting a client request to the server-side plugin through the front-end plugin, the client request carrying an application layer protocol information parameter, and the client request requesting the server-side plugin to render the webpage source code of the webpage, and the application layer protocol information parameter instructing the server-side plugin to determine a rendering mode of the webpage.

4. The method according to claim 1, wherein:

the type of the development framework of the front-end plugin is one of a World-Wide-Web development framework React plugin, a progressive front-end framework Vue2.0 plugin, and a progressive front-end framework Vue3.0 plugin; and the type of the development framework of the server-side plugin is one of a NestJS development framework plugin and a Midway development framework plugin.

5. The method according to claim 4, wherein:

the type of the development framework of the front-end plugin being uncoupled from and unrelated to the type of the development framework of the server-side plugin refers to that the type of development framework of the front-end plugin and the type of development framework of the server-side plugin are arbitrarily combined.

6. A webpage rendering method, performed by a server and comprising:

operating a server-side plugin, a type of a development framework of the server-side plugin being uncoupled from and unrelated to a type of a development framework of a front-end plugin operated in a front-end application, and the server-side plugin being configured to provide a webpage rendering function at a server side;

rendering a webpage source code of a webpage requested by the front-end plugin through the server-side plugin to obtain a rendering result of the webpage, wherein the webpage source code of the webpage comprises a page layout layer code and a page content presentation layer code, the page layout layer code is unrelated to an application logic, and the page content presentation layer code is related to the application logic; and sending the rendering result of the webpage to the front-end plugin, comprising:

in response to the server-side plugin succeeds in rendering the webpage source code, sending the rendering result of the webpage obtained from rendering both the page layout layer code and the page content presentation layer code through the server-side plugin;

in response to the server-side plugin fails to render the webpage source code, sending a degraded rendering result, so that the front-end plugin performs client-side rendering to obtain the rendered webpage, wherein the degraded rendering result comprises a rendered skeleton obtained from rendering the page layout layer code through the server-side plugin, and the page content presentation layer code is rendered by the front-end plugin based on the degraded rendering result.

7. The method according to claim 6, wherein the operating a server-side plugin comprises:

operating a server-side plugin corresponding to a first back-end framework in the server, and server-side plugins corresponding to different back-end frameworks have the same operation logic and different adaptive designs.

8. The method according to claim 7, further comprising: obtaining the degraded rendering result in response to that an error occurs during operation of the server-side plugin or during loading of data and the server-side plugin fails to render the webpage source code of the webpage.

9. The method according to claim 6, wherein the rendering a webpage source code of a webpage requested by the front-end plugin through the server-side plugin to obtain a rendering result of the webpage comprises:

receiving a client request transmitted by the front-end plugin through the server-side plugin, the client request carrying an application layer protocol information parameter;

determining a rendering mode of the webpage according to the application layer protocol information parameter, and rendering the webpage source code of the webpage based on the rendering mode to obtain a rendering result of the webpage.

10. The method according to claim 9, further comprising: obtaining the degraded rendering result in response to that an error occurs during operation of the server-side plugin or during loading of data and the server-side plugin fails to render the webpage source code of the webpage.

11. The method according to claim 6, further comprising: obtaining the degraded rendering result in response to that an error occurs during operation of the server-side plugin or during loading of data and the server-side plugin fails to render the webpage source code of the webpage.

12. A non-transitory computer-readable storage medium, storing at least one piece of computer program that, when loaded and executed by a processor, implements a webpage rendering method, and comprising:

operating a front-end plugin in a front-end application, a type of a development framework of the front-end plugin being uncoupled from and unrelated to a type of a development framework of a server-side plugin, and the server-side plugin being configured to provide a webpage rendering function at a server side;

requesting the server-side plugin to render a webpage source code of the webpage through the front-end plugin in response to an open operation for a webpage, wherein the webpage source code of the webpage comprises a page layout layer code and a page content presentation layer code, the page layout layer code is unrelated to an application logic, and the page content presentation layer code is related to the application logic; and receiving a rendering result of the webpage sent by the server-side plugin through the front-end plugin, comprising:

in response to the server-side plugin succeeds in rendering the webpage source code, receiving the rendering result of the webpage obtained from rendering both the page layout layer code and the page content presentation layer code through the server-side plugin;

in response to the server-side plugin fails to render the webpage source code, receiving a degraded rendering result, and performing client-side rendering through the front-end plugin to obtain the rendered webpage, wherein the degraded rendering result comprises a rendered skeleton obtained from rendering the page layout layer code through the server-side plugin, and the page content presentation layer code is rendered by the front-end plugin based on the degraded rendering result.

13. The computer-readable storage medium according to claim 12, wherein the operating a front-end plugin in a front-end application comprises:

operating a front-end plugin corresponding to a first front-end framework in the front-end application, and front-end plugins corresponding to different front-end frameworks have the same operation logic and different adaptive designs.

14. The computer-readable storage medium according to claim 13, wherein the requesting the server-side plugin to render a webpage source code of the webpage through the front-end plugin in response to an open operation for a webpage, comprises:

transmitting a client request to the server-side plugin through the front-end plugin, the client request carrying an application layer protocol information parameter, and the client request requesting the server-side plugin to render the webpage source code of the webpage, and the application layer protocol information parameter instructing the server-side plugin to determine a rendering mode of the webpage.

\* \* \* \* \*